March 18, 1969     C. C. PENNINGTON     3,433,206
ANTI-CLOG DEVICE FOR AIR INTAKE ON AIR-COOLED GAS ENGINES
Filed Aug. 4, 1967

Inventor:
Clifford C. Pennington
By Bair, Freeman &
Molinare Attys.

United States Patent Office 3,433,206
Patented Mar. 18, 1969

3,433,206
ANTI-CLOG DEVICE FOR AIR INTAKE ON
AIR-COOLED GAS ENGINES
Clifford C. Pennington, Melody Lane,
Wheaton, Ill. 60187
Filed Aug. 4, 1967, Ser. No. 658,481
U.S. Cl. 123—41.7                              7 Claims
Int. Cl. F01p 5/02, 5/06

ABSTRACT OF THE DISCLOSURE

A rotating circular screen with attached fins which fits over the air intake duct of an air-cooled gas engine to prevent grass and similar debris from clogging the air intake and subsequently causing the engine to overheat.

Background of the invention

This invention relates to an anti-clog device which prevents debris from entering the air intake of an air-cooled gasoline engine thereby preventing overheating of the engine. More particularly, this invention relates to a rotating screen having fins or blade members attached thereto, the screen itself being placed in the air intake of the engine to prevent debris from clogging the intake.

Relatively low horsepower, air-cooled gasoline engines are utilized to operate machinery for many non-heavy duty jobs. The economy and simplicity of the air-cooled gasoline engine makes it especially advantageous for use in power mowers, especially of the type used on residential lawns, cemeteries, and estates. A problem frequently encountered in the use of air-cooled engines for lawn mowing operations has been the clogging of the air intake of the air intake duct assembly which directs air over cooling fins on the engine.

Various attempts have been made to remedy this complication. For example, a stationary screen has been positioned over the air intake to collect and prevent the debris from clogging the duct assembly. However, debris merely collected on the screen and clogged it. Another solution has been to attach the screen to a rotating shaft in the air intake. The rotating shaft and screen were thought to prevent debris from collecting on the air intake screen and throw off any debris that did collect on the screen.

Nonetheless, the various solutions all encountered the same drawback. Namely, grass and other debris would collect on the intake screen, even when rotating, clog the screen, and sometimes filter through it. This caused the engine to overheat and stop or be damaged.

Summary of the invention

In a principal aspect the present invention of an improved anti-clog device on the air intake on an air-cooled gasoline engine comprises a rotating screen having at least one fin or blade member attached to its outer surface substantially coincident with a radius of the screen.

Thus, it is an object of the present invention to provide an improved anti-clog device for the air intake of an air-cooled gasoline engine.

It is a further object of the present invention to provide an economical and simply constructed air intake, anti-clog device.

Still another object of the present invention is to provide an anti-clog air intake device which prevents grass or other debris from collecting in or about the air intake and causing the engine to overheat.

These and other objects, advantages and features will be more fully set forth in the detailed description which follows.

Brief description of the drawings

In the detailed description which follows, reference will be made to the following drawings in which.

Description of the preferred embodiment

Figure 1:
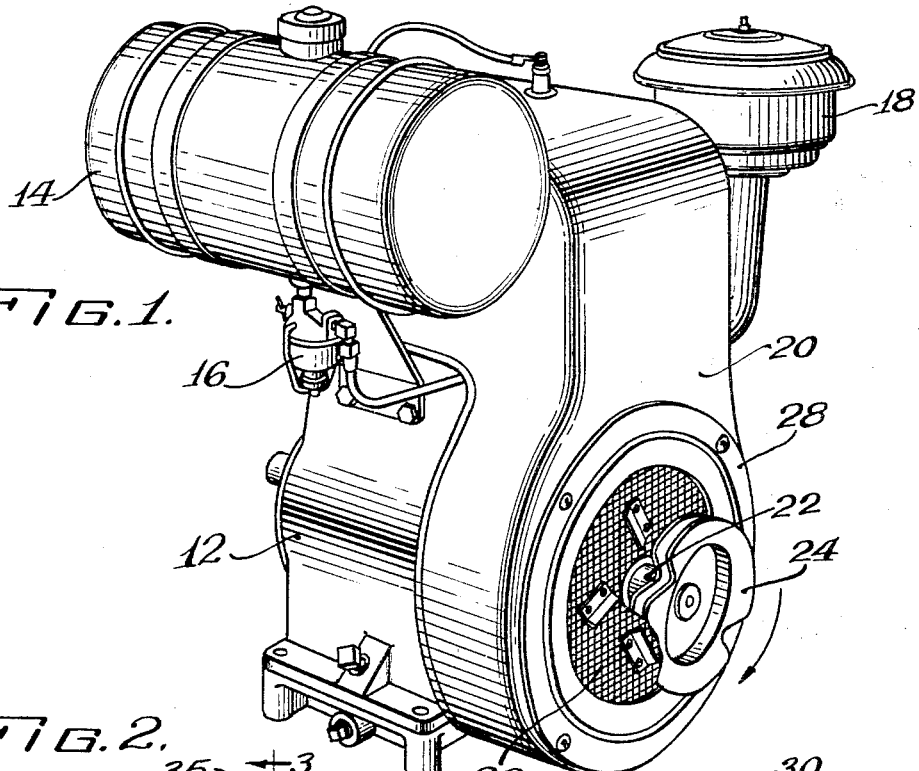
FIG. 1 is a perspective view of the improvement of the invention incorporated with a typical air-cooled gasoline engine.

FIG. 1 illustrates a typical air-cooled gasoline engine generally comprised of the block portion 12, a gas tank 14, fuel filter assembly 16, air cleaner and intake for the cylinder 18, and a cooling air duct assembly 20. The structural features of the gasoline engine are not a limiting feature of this invention. The invention is directed toward air-cooled engines of the type having an air duct assembly which directs and/or drives air over cooling fins on the engine block, for example, of the type illustrated at 20 in FIG. 1.

Extending through the block portion 12 and out through the air intake of the duct assembly 20 is a drive shaft 22. The shaft 22 defines a center line axis through the air intake of the duct assembly 20. Attached at the outermost end of the shaft 22 is a rope starter sheave 24.

Also fixed to the shaft 22 is a disk element or rotating screen 26. A rim member 28 surrounds the outer circumference of the rotating screen 26 to facilitate the prevention of debris from entering through the air intake of the duct assembly 20. The rotating screen 26 rotates freely with the shaft 22 in the direction indicated by the arrow in FIG. 1.

The construction of the rotating screen 26 is further illustrated by reference to FIGS. 2 and 3. The rotating screen 26 is preferably fabricated from a wire mesh material. The outer periphery of the rotating screen 26 is covered with a protective rim material 30 which prevents the wire mesh from unravelling and also adds structural strength to the rotating screen 26. The screen is circular and has a central hub portion 32 for fastening the screen 26 to a shaft such as 22 in FIG. 1. The screen also has an outer surface 54.

Radial elements may be visualized extending from the center of the circular screen 26 to its outer periphery. For example, a radial element is designated by the numbers 6—6. Attached to the screen 26 and intersected by the radial element 6—6 is a fin or blade member 34. The blade member or blade 34 is held attached to the screen 26 by a pair of nuts and bolts 39 and 40. The remaining blades 35–37 are similarly attached to the screen 26.

Figure 4:
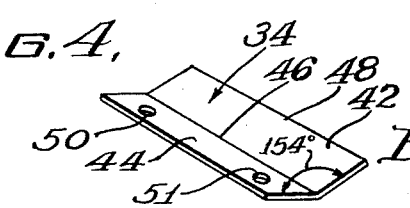
FIG. 4 is an enlarged perspective view of a typical fin or blade member.

FIG. 4 shows a typical blade which for the purposes of illustration will be identified by the number 34. All the blades are similar in construction to the blade in FIG. 4 and thus a description of the blade 34 in FIG. 4 will serve to describe all the other blades in this detailed description.

The blade 34 has a working portion 42 and an attachment portion 44. Each portion is substantially rectangular in shape and the boundary between the working portion 42 and the attachment portion 44 is defined as the leading edge 46 of the blade 34. The opposite side of the working portion 42 parallel to the leading edge 46 is the trailing edge 48. Openings 50 and 51 are provided in the attachment portion 44 to receive the attachment nuts and bolts 39 and 40 respectively for attachment of the blade 34 to the screen 26.

The working portion 42 and attachment portion 44 define an obtuse angle of approximately 154° as illustrated in FIG. 4. Thus, when the blade 34 is attached to the screen 26 the acute angle defined by the outer surface 54 of the screen 26 and the working portion 42 of the blade 34 is approximately 26°.

Figure 2:
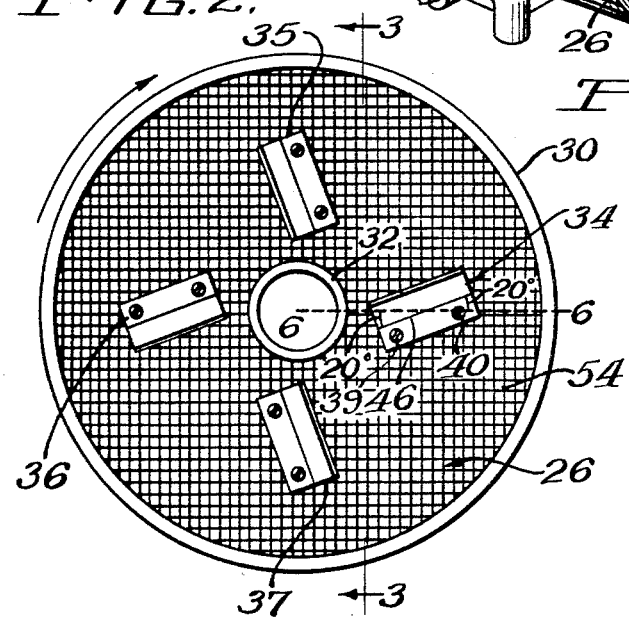
FIG. 2 is a plan view of the improvement of the invention having four fins or blade members.
Figure 3:
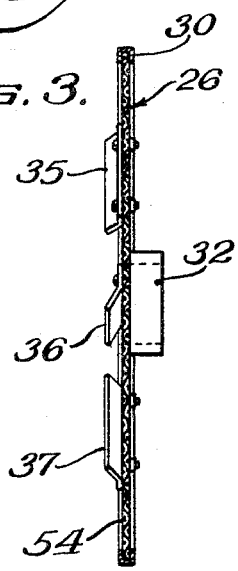
FIG. 3 is a cross-sectional view taken substantially along the line 3—3 of FIG. 2.

Referring now to FIG. 2, the blade 34 is attached to the screen 26 approximately midway along the radial element 6—6. The radial element 6—6 is a segment of a radius of the screen 26 extending from the center of the screen 26 to the outer edge. In addition, as indicated, the leading edge 46 forms alternate acute angles of approximately 20° with the radial element 6—6. The width of the blade, or in other words, the length of the leading edge 46, is approximately one-half of the length of a radius of the screen 26. As indicated by the arrow in FIG. 2, the angle formed by the working portion 42 of the blade 34 and the outer surface 54 of the screen 26 is substantially coincident with the direction of rotation of the rotating screen 26 indicated by the arrow in FIG. 2. The other blades 35, 36 and 37 are similarly constructed and attached to the screen 26.

While the description of the preferred embodiment is directed to a four blade rotating screen, and particularly sets forth the construction and manner in which the blades may be positioned on the screen, there are various other adaptations within the scope of the invention. For example, a single blade may be utilized or more than one one blade. Preferably, when more than one blade is utilized, they are symmetrically positioned on the screen. For example, the blades would be positioned 120° apart on a three blade screen, and the blades would be positioned 180° apart on a two blade screen. The fins or blades may also be constructed in various manners having different dimensions and projecting from the surface of the screen at various other angles. Further, the blade may be flexible, segmented or have other variations in construction.

Thus, it is to be understood that the invention is not limited to the precisely described device but shall include all those devices which are obvious to persons skilled in the art and all those devices which are equivalent to the invention as claimed.

I claim:
1. In an air-cooled engine having a shrouded duct assembly for directing air about said engine, said duct including an air intake, said air intake having a center line axis, the improvement comprising, in combination:
   a rotating disk element having an outside surface, said element rotating about said axis and positioned in said air intake, said element having a plurality of apertures for admitting air therethrough to cool said engine, and
   at least one fin element attached to the outside surface of said rotating disk element, said fin element projecting from the surface of said disk element to guide and discharge debris from said disk element and prevent clogging of said air intake.

2. The improvement of claim 1 wherein a plurality of fin elements are symmetrically arranged about said axis on said disk element.

3. The improvement of claim 2 wherein said fins comprise four blade members, each of said blade members being positioned substantially along a radius of said disk element and spaced approximately 90° from each adjacent blade member.

4. The improvement of claim 1 wherein said disk element is comprised of a screen material.

5. The improvement of claim 1 wherein said fin elements are comprised of a blade formed from a sheet material, said blade having a leading edge and a trailing edge substantially parallel to said leading edge, said leading edge being substantially coincident with a radius of said disk element, said leading edge being adjacent said disk element and said trailing edge being spaced from said disk element so that said blade and said disk element define an acute angle, said acute angle being pointed substantially in the direction of rotation of said disk element.

6. The improvement of claim 5 wherein said leading edge of each of said blades defines alternate acute angles on the outside surface of said screen of approximately 20° with a radius of said disk element, and said acute angle defined by said blade and said disk element is approximately 26°.

7. The improvement of claim 5 wherein said blade has a leading edge and a trailing edge length of approximately one-half the length of the radius of said disk element, said blade being positioned approximately midway along the length of a radius of said disk element, said radius extending from the center of said disk element to an outer edge.

References Cited
UNITED STATES PATENTS

| | | | |
|---|---|---|---|
| Re. 23,146 | 9/1949 | Packwood | 55—400 X |
| 565,464 | 8/1896 | Knapp | 55—400 |
| 1,037,659 | 9/1912 | Rembert | 230—132 X |
| 1,860,697 | 5/1932 | Traviss | 55—290 |
| 2,601,907 | 7/1952 | Burrows et al. | 55—406 |
| 2,825,318 | 3/1958 | Mansfield | 123—41.56 |
| 3,155,083 | 11/1964 | Middlesworth et al. | 123—41.49 |
| 3,183,899 | 5/1965 | Tuggle | 123—41.7 X |

AL LAWRENCE SMITH, *Primary Examiner.*

U.S. Cl. X.R.

55—403, 406; 56—25.4